United States Patent Office 3,117,982
Patented Jan. 14, 1964

3,117,982
6-SUBSTITUTED IONONES AND METHODS AND INTERMEDIATES USED IN THEIR PRODUCTION
Derek H. R. Barton, London, England, assignor to Fritzsche Brothers, Inc., New York, N.Y., a corporation of New York
No Drawing. Filed Sept. 19, 1960, Ser. No. 56,656
Claims priority, application Great Britain Oct. 7, 1959
14 Claims. (Cl. 260—348)

The present invention relates to compositions and processes for the synthesis of irones and other 6-substituted ionones.

α-Irone, which possesses the general formula

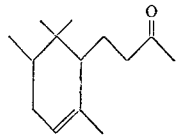
(I)

is a principal component of the perfume of violets and finds considerable use in the perfume industry. The synthetic routes leading to irone which have thus far been reported comprise a large number of steps and there is, therefore, a demand for a simpler route comprising comparatively few steps.

In accordance with this invention, irone and related compounds are produced from the available compound ψ-ionone by a simplified procedure using as an essential intermediate a novel epoxide of ψ-ionone. When ψ-ionone, which has the formula

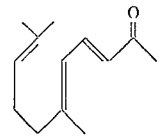

is reacted with reagents which convert a carbon-carbon double bond to an epoxide group, more particularly organic per acids, for example perbenzoic acid, monoperphthalic acid and peracetic acid, the unconjugated double bond can be selectively epoxidised and the compound having the formula

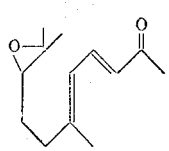
(II)

is formed in good yield. The reaction may be carried out by reacting ψ-ionone preferably in solution in an inert solvent, for example ether or benzene, with an organic per acid, such as peracetic acid, perbenzoic aicd or monoperphthalic acid. The reaction is advantageously carried out at reduced temperatures, for example 0° C.

The epoxide II, which is a new compound, is a particularly useful intermediate in the synthesis of known synthetic perfumes and of hitherto unprepared perfume analogues. By reaction of II, after suitable protection of the ketonic carbonyl, with Grignard reagents, or metal alkyls, it is possible to form ketols which may be cyclised to 6-alkyl ionones. Thus, by using a methylating metal derivative it is possible to prepare the 6-methyl-ionone, irone.

The particular utility of epoxide II in perfume synthesis is illustrated by the following synthesis of irone.

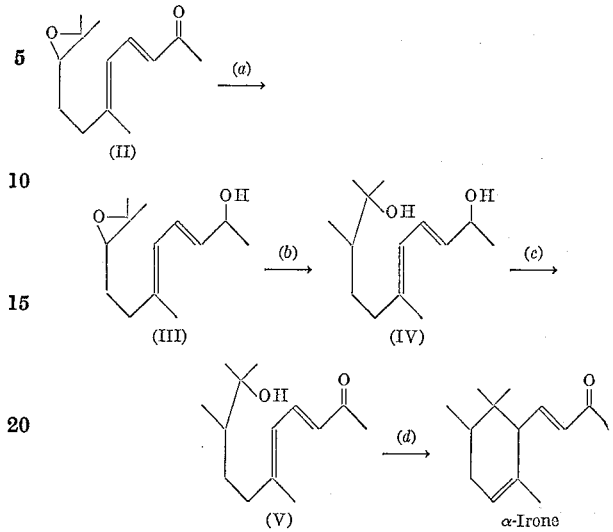

In step (a) the keto group of epoxide II is protected by reduction to a hydroxyl group to avoid reaction with the Grignard reagent used in the next step. The reduction, which should be achieved without substantial reduction of the epoxide or of the conjugated double bonds, is conveniently carried out using a metal hydride reducing agent such as sodium borohydride. It is, however, possible to protect the keto group by means other than reduction. Thus, for example, the ketoxime may be formed by reaction with hydroxylamine or the semicarbazone with semicarbazide. In general, the protecting group should not react with the Grignard or other alkylating reagent used in the next step or should react more slowly than does the epoxide. Formation of the ketal derivative does not however, appear to be a satisfactory means of protection.

In step (b) of the reaction sequence, the epoxyalcohol III is reacted with an organometallic compound. Where 6-substituted ionones other than irone are required, the organometallic compound may carry other alkyl groups or aralkyl groups. As an alternative to magnesium derivatives, it is possible to use alkali metal alkyls such as lithium alkyls. The reaction is preferably carried out in an inert solvent under anhydrous conditions using an excess of the organometallic compound.

The oxidation step (c) shown in the above reaction route may be accomplished in any convenient way, advantageously using active manganese dioxide. Where, however, the keto group was protected, not by reduction but by conversion to a protected grouping, other methods are required to reform the keto group. Thus, for example, where an oxime or a semicarbazide is formed as the protected group, mild hydrolysis with dilute mineral acid yields the desired keto group.

The cyclisation step (d) shown in the above reaction route may be conveniently carried out by contacting the ketol V with a cyclising agent. Suitable cyclising agents include strong mineral acids, such as sulphuric acid, phosphoric acid or toluene sulphonic acid, and Lewis acids, such as boron trifluoride.

Ionones exist in three principal isomeric forms which differ in the positioning of the double bond adjoining the 3-position as shown below.

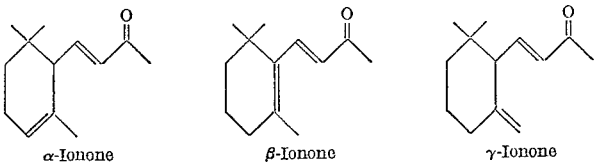

α-Ionone    β-Ionone    γ-Ionone

The order of stability of these forms appears to be β α γ and it is found that in the presence of a strong acid or a Lewis acid and under rigorous conditions, γ-ionone is converted to α-ionone which, if the conditions are sufficiently rigourous, is converted to β-ionone. The rigour of the conditions is determined principally by the temperature and the presence or absence of a polar solvent, as well as by the nature of the strong acid or Lewis acid used.

In order to obtain α-irone, for example the ketol V may be cyclised by addition into concentrated aqueous phosphoric acid. Addition of the ketol V to a solution of boron trifluoride in a non-polar solvent, for example ether, leads, however, to γ-irone while addition to a boiling aqueous solution of sulphuric or phosphoric acid yields the β-isomer.

Similar results are obtained on direct cyclisation of the epoxide II, forcing conditions yielding 6-hydroxy-β-ionone, while milder conditions lead to the α- or γ-isomers. The 6-hydroxy derivatives so formed may be oxidised to 6-keto derivatives, for example with chromium trioxide and, if the sidechain keto group has been protected before oxidation, the 6-keto group may be further reacted with, for example, Grignard reagents to give 6-alkyl-6-hydroxy-ionones.

It will be thus seen that the novel epoxide of ψ-ionone according to the present invention may be simply converted both to the known perfume α-irone and to other 6-substituted ionones of interest in the perfume industry.

In order that the invention may be well understood, we give the following examples by way of illustration only. Melting points are given in the centigrade scale and were taken on the Koffler block. All ultra-violet absorption spectra were determined in ethanol using the Unicam S.P. 500 spectrophotometer. Infra-red spectra are for the pure compound unless specified to the contrary. Light petroleum refers to the fraction of B.P. 40–60° C.

EXAMPLE 1

*ψ-Ionone Epoxide (II)*

ψ-Ionone (15 g.) in ether (50 ml.) was treated at 0° with stirring with monoperphthalic acid (15 g.) in the same solvent (300 ml.) and left for 24 hours. The solution was washed successively with aqueous sodium hydrogen carbonate, with 1 N aqueous sodium hydroxide and then with water. The dried sodium sulfate solution gave on distillation ψ-ionone epoxide (13 g.), B.P. 118°/0.7 mm., $n_D^{25}$ 1.185, λ max. 291 mμ (ε=21,000). This was characterised as the 2,4-dinitrophenylhydrazone of ψ-ionone epoxide. Prepared by the method of Braude and Timmons (J., 1953, 3136), this had M.P. (from ethanol) 159–160°, λ max. 392 mμ (ε=33,000). (Found: C, 58.5; H, 6.05; N, 14.55. $C_{19}H_{24}O_3N_4$ requires C, 58.75; H, 6.25; N, 14.45%.)

EXAMPLE 2

*ψ-Ionol Epoxide (III)*

ψ-Ionone epoxide (13 g.) in methanol (200 ml.) at 0° was treated with sodium borohydride (½ mol.) until the ketonic function had been reduced [ultra-violet control: disappearance of the band at 291 mμ and appearance of a new band (ε=20,000 approx.) at 240 mμ]. The excess of sodium borohydride was destroyed with acetic acid and then a slight excess of sodium hydrogen carbonate was added. The methanol was removed in vacuo, the residue extracted into ether, dried sodium sulfate and then distilled to furnish ψ-ionol epoxide (12 g.), B.P. 105°/0.2 mm., λ max. 240 mμ (ε=23,000). (Found: C, 73.85; H, 10.55. $C_{12}H_{32}O_2$ requires C, 74.25; H, 10.55%.)

EXAMPLE 3

*2,3,6-Trimethylundeca-6,8-Dien-2,10-Diol*

Magnesium (6 g.) was converted to the Grignard reagent using methyl bromide (20 ml.) in purified tetrahydrofurane (200 ml.). To this solution was added slowly with stirring ψ-ionol epoxide (12 g.) in the same solvent (120 ml.) and left for one hour. The reaction mixture was then refluxed for 4 hours, cooled, treated with excess of saturated aqueous ammonium chloride at 0°. After ether extraction and drying over sodium sulfate the ether and tetrahydrofurane were removed in vacuo at 40°. The residue could not be distilled due to decomposition but it analysed correctly for the expected glycol, the 2,3,6-trimethylundeca-6,8-dien-2,10 diol, (IV); λ max. 240 mμ (ε=25,000). (Found: C, 74.3; H, 11.3. $C_{14}H_{20}O_2$ requires C, 74.3; H, 11.6%.)

EXAMPLE 4

*2,3,6-Trimethylundeca-6,8-Dien-2-Ol-10-One*

The glycol of Example 3 (10.3 g.) in dry ether (500 ml.) was shaken with active $MnO_2$ (105 g.) at room temperature and the progress of the oxidation followed in the ultra-violet. After 48 hours there was no further increase in the intensity of the band at 291 mμ (ε=18,000). Removal of the $MnO_2$ by filtration and of the ether in the usual way gave a residue (10 g.) which had λ max. 291 mμ (ε=18,000) and showed an OH band in the infra-red (3625 cm.$^{-1}$). It was characterised as the ketol (V) by the preparation of the 2,4-dinitrophenylhydrazone, M.P. (from benzene-light petroleum) 173°, λ max. 392 mμ (ε=32,000). (Found: C, 58.9; H, 7.15; N,14.1.

$$C_{20}H_{28}O_5H_4$$

requires C, 59.4; H, 7.0; N, 13.85%.)

EXAMPLE 5

*Synthesis of α-Irone*

The ketol, 2,3,3-trimethylundeca-6,8-dien-2-ol-10-one (10 g.) was added dropwise with good stirring to phosphoric acid (90%; 30 ml.) at 30° and the mixture stirred for 15 minutes. Excess of ice water was added and the cyclised product extracted into ether. The ether was removed and the residue steam distilled to give an oil, B.P. 73°/0.3 mm., $n_D^{25}$ 1.5000, λ max. 228 mμ (ε=11,200) and ca. 290 mμ (ε=2,000), the latter band indicating the presence of some β-irone. The oil gave a phenyl semicarbazone M.P. (initially) 165° raised to 172° on recrystallisation from ethanol. (Found: C, 74.55; H, 8.6; N, 12.5, 12.65. Calc. for $C_{21}H_{29}ON_3$: C, 74.3; H, 8.6; N, 12.4%.) Authentic synthetic α-irone gave a derivative of the same melting point undepressed on admixture. The infra-red spectra (in chloroform) were identical. Conversion to the 2,4-dinitrophenylhydrazone and crystallisation from methanol gave a derivative M.P. 103–104°, undepressed on admixture with an authentic specimen of the same melting point prepared from authentic synthetic α-irone through the phenyl semicarbazone of M.P. 172°.

Other 6-substituted cyclic ionones are produced in the same manner as the α-irone described in Examples 1 through 5. For this purpose, the starting material is ψ-ionol which may be prepared by following the procedures of Examples 1 and 2. Example 3 is then followed for the preparation of the required glycol except that instead of using methyl bromide, there is employed an alkyl halide or an aralkyl halide, such as bromide or chloride, containing the alkyl or aralkyl group which is desired in the 6 position of the substituted cyclic ionone. For instance, if a 6-n-propyl-α-ionone is desired, 6-n-propyl bromide may be used instead of methyl bromide in the procedure of Example 3 to produce 2,3-dimethyl-6-n-propyl-6,8-dien-2,10-diol. This latter glycol constitutes the starting material for producing the corresponding ketol by following the procedure outlined in Example 4 and the resulting ketol is cyclised as described in Example 5. Again, the 6-benzyl-α-ionone is produced in the same manner by utilizing a benzyl halide, such as benzyl chloride, instead of the methyl bromide in Example 3, and following the procedures of Examples 4 and 5 with the resulting benzyl reaction products.

What is claimed is:

1. 2,6 - dimethyl-3-substituted-undeca-6,8-dien-2-ol-10-one having the formula:

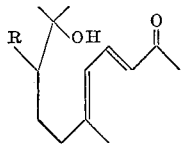

in which R is a monovalent group having less than 8 carbon atoms selected from the class consisting of unsubstituted alkyl and unsubstituted aralkyl groups.

2. 2,6 - dimethyl-3-unsubstituted alkylundeca-6,8-dien-2-ol-10-one in which the alkyl group has less than 8 carbon atoms.

3. 2,6-dimethyl-3-unsubstituted aralkylundeca-6,8-dien-2-ol-10-one in which the aralkyl group has less than 8 carbon atoms.

4. 2,6 - dimethyl - 3-substituted-undeca-6,8-dien-2,10-diol having the formula:

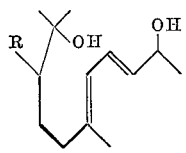

in which R is a monovalent group having less than 8 carbon atoms selected from a class consisting of unsubstituted alkyl and unsubstituted aralkyl groups.

5. 2,6 - dimethyl-3-unsubstituted-alkylundeca-6,8-dien-2,10-diol in which the alkyl group has less than 8 carbon atoms.

6. 2,6 - dimethyl - 3 - unsubstituted-aralkylundeca-6,8-dien-2,10-diol in which the aralkyl group has less than 8 carbon atoms.

7. 2,3,6-trimethylundeca-6,8-dien-2,10-diol.

8. 2,6-dimethyl-2,3-epoxyundeca-6,8-diene-10-one.

9. 2,6-dimethyl-2,3-epoxyundeca-6,8-diene-10-ol.

10. The ketoxime of 2,6-dimethyl-2,3-epoxyundeca-6,8-diene-10-one.

11. The semicarbazone of 2,6-dimethyl-2,3-epoxyundeca-6,8-diene-10-one.

12. The 2,4-dinitrophenylhydrazone of 2,6-dimethyl-2,3-epoxyundeca-6,8-diene-10-one.

13. In the method of producing a 6-substituted cyclic ionone the step of reacting ψ-ionone in solution in an inert solvent with a percarboxylic acid to produce 2,6-dimethyl-2,3-epoxyundeca-6,8-diene-10-one, treating 2,6-dimethyl-2,3-epoxyundeca-6,8-diene-10-one with an alkali metal borohydride until the ketonic group thereof has been reduced to the hydroxyl group, reacting under anhydrous conditions the resulting 2,6-dimethyl-2,3-epoxyundeca-6,8-diene-10-ol with a Grignard reagent having the formula: R—Mg—X, in which X is a halogen selected from the class consisting of chlorine and bromine and R is a member having less than 8 carbon atoms selected from the class consisting of unsubstituted alkyl groups and unsubstituted aralkyl groups, oxidizing the resulting 3-substituted-2,6-dimethylundeca-6,8-diene-2,10-diol with manganese dioxide to produce a 3-substituted-2,6-dimethylundeca-6,8-diene-2-ol-10-one and adding slowly the last mentioned compound to an acid to produce the 6-substituted cyclic ionone, said acid being selected from the class consisting of sulphuric acid, phosphoric acid, Lewis acids and toluene sulphonic acid.

14. In the method of producing α-irone, the step of reacting ψ-ionone in solution in an inert solvent with a percarboxylic acid to produce 2,6-dimethyl-2,3-epoxyundeca-6,8-diene-10-one, treating 2,6-dimethyl-2,3-epoxyundeca-6,8-diene-10-one with an alkali metal borohydride until the ketonic group has been reduced to the hydroxyl group, reacting under anhydrous conditions the resulting 2,6-dimethyl-2,3-epoxyundeca-6,8-diene-10-ol with a methyl halide Grignard reagent selected from the class consisting of methyl chloride Grignard reagent and methyl bromide Grignard reagent to produce 2,3,6-trimethylundeca-6,8-diene-2,10-diol, oxidizing the 2,3,6-trimethylundeca-6,8-diene-2,10-diol with manganese dioxide to produce 2,3,6-trimethylundeca-6,8-diene-2-ol-10-one and adding slowly the last mentioned compound to an acid to produce α-irone, said acid being selected from the class consisting of sulphuric acid, phosphoric acid, Lewis acids and toluene sulphonic acid.

References Cited in the file of this patent

UNITED STATES PATENTS 2,877,271    Kaiser et al. _____ Mar. 10, 1959
3,041,356    Payne et al. _____ June 26, 1962

OTHER REFERENCES

Swern: J.A.C.S., vol. 69, pp. 1692–1698 (1947).
Simonsen: "The Terpenes," vol. I, pages 123–4, 126, Cambridge (1947).
Swern: "Chem. Reviews," 45: 1–68, 1949.
West et al.: "Synthetic Perfumes," pages 172, 181, Edward Arnold Co., 1949.
Simonsen: "The Terpenes," vol. III, pages 494 and 497, Cambridge, 1951.
Attenburrow et al.: J. Chem. Soc. (London), 1100, 1108 (1952).
Ackroyd et al.: J. Chem. Soc. (London), 4103 (1957).
Barton et al.: J. Chem. Soc. (London), 271, 272 (1960).
Brewster: Organic Chemistry, 1954, New York, pp. 164–165.

UNITED STATES PATENT OFFICE
CERTIFICATE OF CORRECTION

Patent No. 3,117,982 January 14, 1964

Derek H. R. Barton

It is hereby certified that error appears in the above numbered patent requiring correction and that the said Letters Patent should read as corrected below.

Column 1, line 54, for "aicd" read -- acid --; column 3, line 59, for "1.185" read -- 1.5185 --.

Signed and sealed this 9th day of June 1964.

(SEAL)
Attest:

ERNEST W. SWIDER
Attesting Officer

EDWARD J. BRENNER
Commissioner of Patents